United States Patent
Mueller

(10) Patent No.: US 9,261,378 B2
(45) Date of Patent: Feb. 16, 2016

(54) NAVIGATION ASSISTANCE, DRIVER ASSISTANCE SYSTEM, AS WELL AS METHOD FOR NAVIGATING AT LEAST ONE MEANS OF TRANSPORTATION

(75) Inventor: Ruediger Mueller, Bad Salzdetfurth (DE)

(73) Assignee: ROBERT BOSCH GMBH, Stuttgart (DE)

( * ) Notice: Subject to any disclaimer, the term of this patent is extended or adjusted under 35 U.S.C. 154(b) by 2327 days.

(21) Appl. No.: 12/085,282

(22) PCT Filed: Nov. 24, 2006

(86) PCT No.: PCT/EP2006/068888
§ 371 (c)(1),
(2), (4) Date: Aug. 7, 2009

(87) PCT Pub. No.: WO2007/063038
PCT Pub. Date: Jun. 7, 2007

(65) Prior Publication Data
US 2009/0306886 A1    Dec. 10, 2009

(30) Foreign Application Priority Data
Dec. 1, 2005    (DE) .......................... 10 2005 057 264

(51) Int. Cl.
*G01C 21/36* (2006.01)
(52) U.S. Cl.
CPC ................................. *G01C 21/3641* (2013.01)

(58) Field of Classification Search
USPC .................. 701/200–202, 207–209, 23–25; 340/995.1, 995.19, 995.27
See application file for complete search history.

(56) References Cited

U.S. PATENT DOCUMENTS

| 6,978,209 B2 * | 12/2005 | Nakahara et al. ............. 701/410 |
| 7,092,818 B2 * | 8/2006 | Ohler ............................ 701/209 |
| 7,197,394 B2 * | 3/2007 | Ohler ............................ 701/209 |
| 2003/0195701 A1 * | 10/2003 | Ohler ............................ 701/209 |

FOREIGN PATENT DOCUMENTS

| DE | 102 42 125 | 3/2004 | | |
| JP | 09-089581 | 4/1997 | | |
| JP | 2003 254771 | 9/2003 | | |
| JP | 2005241303 A | * | 9/2005 | ............. G01C 21/00 |
| JP | 2005249555 A | * | 9/2005 | ............. G01C 21/00 |

* cited by examiner

*Primary Examiner* — Rami Khatib
(74) *Attorney, Agent, or Firm* — Kenyon & Kenyon LLP

(57) ABSTRACT

A navigation assistance system for a vehicle enables possible routes from the starting point to a destination to be ascertained with the aid of route network data, a preferred route being specified, and at least one driving recommendation that guides at least one user along the specified route being output, such that no driving recommendations are output that are superfluous for and therefore irritating and/or disturbing to the operator of the vehicle. The number of times or the frequency with which the vehicle has already previously passed at least one location point or junction point of the preferred route is ascertained, and the at least one driving recommendation for this point of the preferred route is suppressed if the ascertained number of times or frequency reaches at least one threshold value.

21 Claims, 2 Drawing Sheets

NAVIGATION ASSISTANCE, DRIVER ASSISTANCE SYSTEM, AS WELL AS METHOD FOR NAVIGATING AT LEAST ONE MEANS OF TRANSPORTATION

BACKGROUND OF THE INVENTION

1. Field of the Invention

The present invention relates to a method and a system for navigation assistance.

2. Description of Related Art

In known navigation systems, routes may be defined and calculated. As a result, the user or the operator of a means of transportation, in particular of a motor vehicle, is directed from his location to the desired destination in that the navigation system constantly gives the user or driver driving instructions until he has reached his destination.

In doing this, conventional navigation systems attempt to direct the user or driver along the most convenient route, which is ascertained by the navigation system. The user or driver can define a home address in these known navigation systems; however, this has no influence on the route guidance.

In an area with which the user or driver is familiar, for example, the area surrounding his home, it is rarely advantageous to use a navigation system, however. For one thing, the input of destination addresses is associated with additional effort, and for another thing, the driving instructions or driving recommendations in the known area present a disturbance, because the way to drive is obvious to the user or the driver. It would be obvious, of course, to turn off the navigation system in the nearby area.

However, if the user or driver is forced by circumstances to leave the route known to him, the navigation system could calculate an alternative route for him in the known way and lead him to the destination on this route. However, for this purpose, the navigation system must also be used in the nearby area.

A navigation system that takes into account whether the user or driver knows the section of road being passed is described in the published German patent document DE 102 42 125. This known navigation system does not provide any correction messages after a specified route has been left if the means of transportation is located in an area that is known to the user or driver.

However, this known navigation system operates relatively schematically with regard to the suppression of correction messages, whereby the flexibility of this known system is restricted.

A BRIEF SUMMARY OF THE INVENTION

An objective of the present invention is to further refine a navigation assistance of the type mentioned at the outset, a driver assistance system of the type mentioned at the outset that is associated with this navigation assistance, as well as a method of the type mentioned at the outset, in such a way that no driving instructions or recommendations that are superfluous and therefore irritating and/or disturbing to the user or operator of the means of transportation are output.

Consequently, the present invention is based on suppressing the driving instruction or driving recommendation to be output for at least one section or at least one part of the preferred route, provided the means of transportation has already previously passed this section or part of the preferred route a particular number of times or with a particular frequency.

The driving instruction or driving recommendation is suppressed in particular if the means of transportation has passed a location or decision point, for example, an intersection or a fork, in the same way a certain number of times or with a certain frequency, in particular on the same route.

According to one advantageous example embodiment of the present invention, the navigation assistance, in particular the driver information system having the navigation assistance, is conditioned in a manner that is analogous, to an extent, to the conditioning of the user or driver.

In this way, it is possible to avoid providing to the user or operator of the means of transportation, in particular of the motor vehicle, superfluous driving instructions or recommendations in an area with which the user or driver is familiar, for example, in the area surrounding his home.

In particular, the competence for the appropriate ways is ceded to the user or driver in an area known to him, for example, in the area surrounding his home; the user or driver is supported by driving instructions or driving recommendations only in an area that is not known (anymore) to the user or driver, for example, in an area that is distant from his hometown.

According to one advantageous further refinement of the present invention, the boundary between the area known to the user or driver, for example, between the area surrounding his home, and the area that is not known to the user or driver, may be defined by at least one threshold distance value measured preferably as a function of at least once reference point; this threshold distance value may be drawn as a radius, so to speak, around the reference point of the user or operator of the means of transportation.

In an optional design that is essential to the invention, this reference point may be, for example, at least one home or starting point; alternatively, the reference point may also be something such as the temporary or permanent central point of life and/or work of the user or operator of the means of transportation.

In contrast to conventional navigation systems that behave homogenously throughout the entire data area of at least one database storing route network data or road network data, for example, and that therefore provide driving instructions or driving recommendations in the same way at all places on the route network or road network, the route guidance according to the present invention is adjusted to the requirements of the user or driver.

The system behavior, in particular the route guidance, according to the present invention is thus advantageously modified from a homogenous behavior to a differentiated behavior.

The present invention additionally provides the advantage that the suppression of the driving instruction or driving recommendation is not necessarily set for a particular geographical area, for example, the area surrounding the home and/or the area surrounding the work place of the user or driver, but rather may always be provided if the means of transportation is located in an area that is frequently passed by the user, for example.

This is particularly advantageous because there are also routes and/or roads in the area near an area known to the user or driver that are not yet known to the user or driver, for which reason the driving instructions or driving recommendations should not be suppressed there. On the other hand, there may also be routes and/or roads in an area distant from an area known to the user or driver that are well-known to the user or driver.

For this reason, the information concerning the movement of the means of transport, in particular at least one part of the driving instructions or recommendations that are output, and/or at least one section or at least one part of the route traveled by the means of transportation, is stored in at least one memory unit, in particular in at least one database.

For example, starting from the first destination input, it is possible to register the passing of locations and/or decision points in that, for example, the driving instructions or driving recommendations, such as "right," "left," or "straight," and/or the direction changes of the means of transportation are registered and stored.

In this connection, the number of times that or the frequency with which the means of transportation has already previously passed the at least one section or the at least one part of the preferred route may be ascertained on the basis of the stored information, in particular using at least one counting module, using at least one counter, for example.

Independently of this or in conjunction with this, at least one probability with which the means of transportation will pass the at least one section or the at least one part of the preferred route may be calculated on the basis of the ascertained number or on the basis of the ascertained frequency.

For example, in accordance with one advantageous specific embodiment of the present invention, the driving instruction or driving recommendation will be suppressed in the future for the at least one section or the at least one part, in particular for the at least one decision point of the preferred route, for example, for the at least one location or junction point, if this at least one section or this at least one part is passed more than ten times in the same way, for example.

However, if this at least one section of this at least one part is at some point passed in another way, then according to one advantageous variant of an embodiment of the present invention, the number of times that or the frequency with which the means of transportation has already previously passed the at least one section or the at least one part of the preferred route, is ascertained again.

For example, in this case, the counting module, in particular the counter, is reset and restarted for this at least one section or this at least one part.

To ensure that the deviation from the preferred route occurred only as an exception, the threshold value for suppressing the driving instruction or driving recommendation at this at least one section or at this at least one part may be increased from ten times to fifteen times, for example.

Advantageously, at least one passing of the at least one section or the at least one part of the preferred route, which passing deviates or was changed from the driving instruction or route instruction or the driving recommendation or route recommendation, is not taken into account, in particular not counted, when ascertaining the number of times that or the frequency with which the means of transportation has already previously passed the at least one section or the at least one part of the preferred route.

Preferably, the disregard, in particular the non-counting, is made dependent in particular on the percentage ratio between the frequency of the deviating passing to the frequency of the proposed passing.

Advantageously, the suppression of the driving instruction or driving recommendation according to the present invention may be restricted to at least one geographical area, for example, to at least one nearby or home area of the user or driver.

This offers the advantage that the option of storing the data and information relating to the movement of the means of transportation does not have to be provided for the entire map area.

This geographical area may be provided as defined by the user or driver in particular to the navigation assistance and/or the driver information system, for example.

However, this geographical area may also advantageously be automatically ascertained by the navigation system by ascertaining the frequency with which the inputted destinations have been selected.

Furthermore, a practical design of the navigation assistance, in particular the driver assistance system, according to the present invention may output a varying number of driving instructions or recommendations as a function of the distance between the means of transportation and the at least one geographic area defined by the user or driver, for example, such as the home location of the user or driver.

For example, the present invention may be set up such that no driving instructions or driving recommendations are output if the user or driver is within the geographical area defined by the user or driver, for example, within at least one radius to be defined around the home coordinates of the user or driver.

In this context, the necessity of a driving instruction or driving recommendation may be ascertained as a percentage, starting from the home coordinates in a radius to be defined using a gradient from the center to the edge of the radius.

Optionally, the navigation assistance may decide with the aid of this necessity whether or not a driving instruction or driving recommendation shall be provided.

Optionally, one example embodiment of the present invention may be designed such that the user or driver is supplied with driving instructions or driving recommendations as usual if the user or driver leaves the defined geographical area.

Furthermore, according to one advantageous example embodiment of the present invention, for example, at least one spatially and/or temporally defined extended area may be determined, within which the number of times that or the frequency with which the means of transportation has already previously passed the at least one section or the at least one part of the preferred route is ascertained, and the suppression of the driving instruction or driving recommendation according to the present invention is provided.

For example, when leaving the defined geographical area within the at least one extended area, in particular restricted temporally and/or restricted by location, the number of times that or the frequency with which the means of transportation has already previously passed the at least one section or the at least one part of the preferred route may be counted, in order to record at least one commuter route if desired. Using this, even a commuter route from Hamburg to Munich could be recorded, for example.

In accordance with one advantageous example embodiment of the present invention, the threshold value may take into account at least one temporal component; for example, the ascertained number or frequency is able to be related to at least one time span or time period.

In accordance with one advantageous example embodiment of the present invention, as a supplement to or instead of the limitation or restriction to the at least one geographical area, the temporal repetition of the event of passing the at least one section or at least one part of the preferred route may thus also be used to limit or restrict memory options.

For example, the larger the time interval until the next passing of the same decision point, the less the driving instruction or driving recommendation may be suppressed.

The present invention concerns in particular an extension of the route guidance component of the navigation assistance according to the type explained above.

Additionally, the present invention concerns a computer program product having at least one program section for executing a method according to the type explained above.

Also, the invention concerns a machine-readable, in particular, computer-readable, storage medium
- on which at least one computer program product in accordance with the type shown above is recorded and/or stored, and
- that is provided for making current and/or updating at least one navigation assistance according to the type explained at the outset.

Finally, the present invention relates to the use of at least one navigation assistance according to the type explained above and/or one method according to the type explained above, and/or at least one computer program product according to the type explained above, and/or at least one machine-readable, in particular, computer-readable, data storage medium according to the type explained above in at least one driver information system, in particular in at least one navigation system, according to the type explained above.

A BRIEF DESCRIPTION OF THE SEVERAL VIEWS OF THE DRAWING

DETAILED DESCRIPTION OF THE INVENTION

Figure 1:
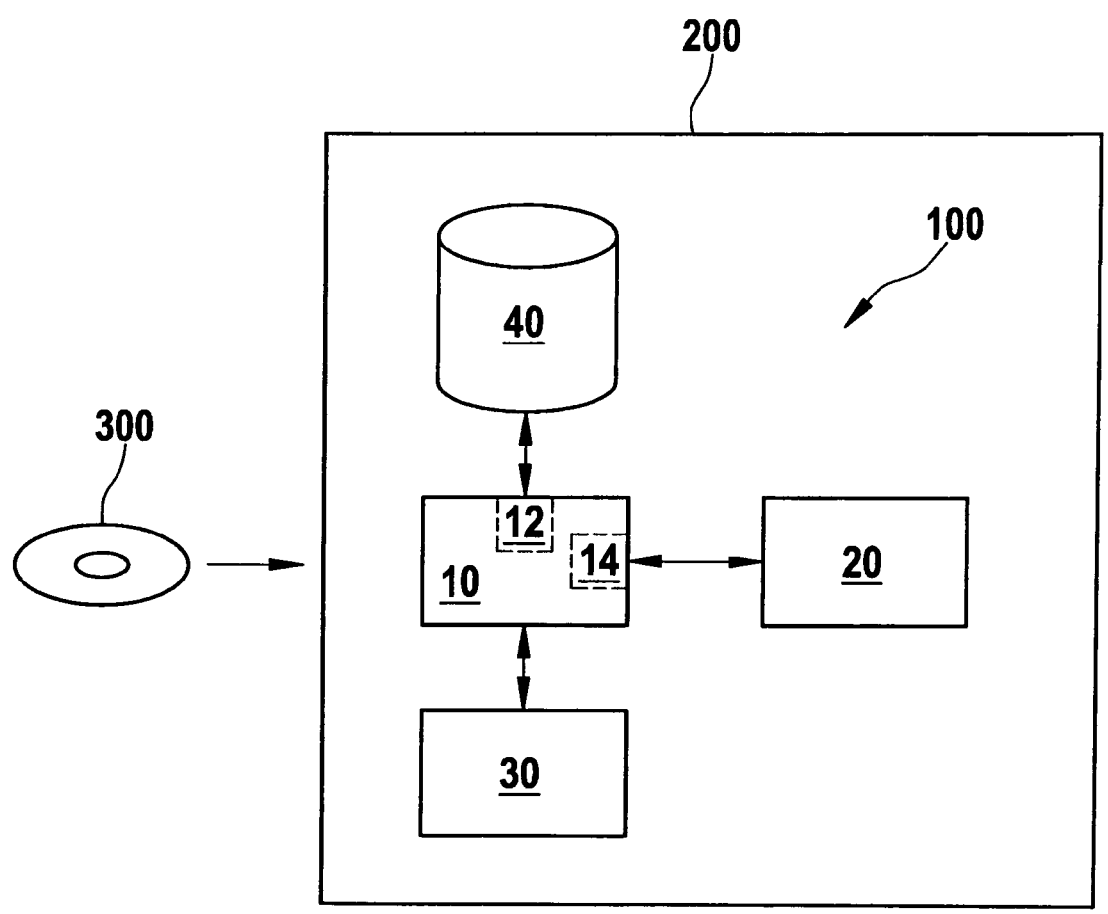
FIG. 1 shows a schematic representation of an exemplary embodiment for a driver information system, in particular a navigation system, according to the present invention, having a navigation assistance according to the present invention and operating according to the method according to the present invention.
Figure 2:
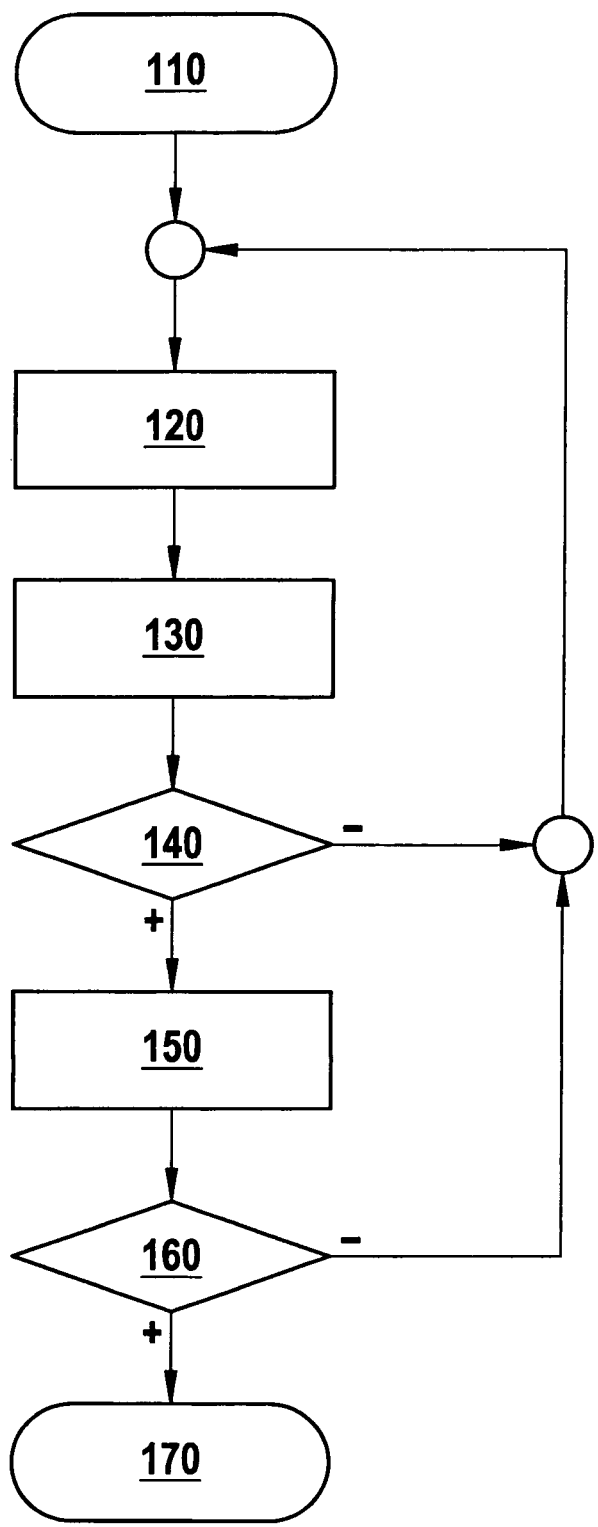
FIG. 2 shows a schematic representation of a sequence/flow chart of an exemplary embodiment for a method according to the present invention.

In FIGS. 1 and 2, equal or similar embodiments, elements or features are provided with identical or equivalent reference numerals.

In FIG. 1, a driver information system, e.g., a navigation system 200, according to the present invention is shown with a navigation assistance 100, in particular with a route-guidance nearby area filter according to the present invention.

Navigation assistance 100 has a route calculation unit 10 for ascertaining possible routes from a starting point to a destination as well as for specifying at least one of the routes preferred among these possible routes.

Route calculation unit 10 has a counting module 12 for ascertaining the number of times that or the frequency with which a means of transportation has already previously passed at least one section or at least one part of the preferred route.

Additionally, route calculation unit 10 has a processor module 14 for ascertaining at least one probability with which the means of transportation passes the at least one section or at least one part of the preferred route.

Route calculation unit 10 communicates with a route guidance unit 20 for outputting driving instructions or driving recommendations that guide the user or operator of the means of transportation along the specified route.

Furthermore, route calculation unit 10 communicates with a memory unit 40, in particular, a database, for storing information relating to the movement of the means of transportation. Furthermore, memory unit 40 may store route network data or road network data.

Further, route calculation unit 10 communicates with a position-finding/sensor unit 30, through which the position and/or the movement, in particular, the movement direction, of the means of transport, may be recorded and the route traveled by the means of transportation may be ascertained.

FIG. 2 depicts an exemplary embodiment of the method according to the present invention.

After starting (reference symbol 110) the route guidance, first the current position of the means of transportation is ascertained (reference symbol 120), using a global positioning system (GPS) module, for example.

Then, the number of times that or the frequency is ascertained (reference symbol 130), with which the means of transportation has already passed at least one section or at least one part, in particular at least one decision point, for example, at least one location or junction point, of the preferred route in the same way (straight, right, left, . . . ).

In this context, the necessity of outputting at least one driving instruction or driving recommendation is consequently checked; in particular, a check is carried out (reference symbol 140) to see whether the ascertained number or the ascertained frequency reaches, in particular exceeds, at least one threshold value.

Provided this does not apply (reference symbol "−" for instruction or recommendation 140), the loop described above is run through once again (140-->120-->130-->140). However, if the ascertained number or the ascertained frequency reaches at least one threshold value (reference symbol "+" for instruction or recommendation 140), the at least one driving instruction or driving recommendation is output (reference symbol 150).

Subsequently, a check is carried out (reference symbol 160) to see whether the target point or the destination has been reached.

If the result of this check is positive (reference symbol "+" for check 160), the method described is terminated (reference symbol 170); otherwise (reference symbol "−" for check 160) the loop described above (160-->120-->130-->140-->150-->160) is run through once again.

What is claimed is:

1. A navigation system, comprising:
  navigation assistance unit for a transportation vehicle, including:
    a route calculation unit configured to a) ascertain possible routes from a starting point to a destination with the aid of route network data, and b) specify a preferred route among the possible routes, wherein the route calculation unit includes a counting module configured to ascertain one of a) the number of times the transportation vehicle has previously passed at least one specified section of the preferred route, or b) the frequency with which the transportation vehicle has previously passed the at least one specified section of the preferred route; and
    a route guidance unit configured to output at least one driving instruction or driving recommendation that guides at least one user along the preferred route, wherein the at least one driving instruction or driving recommendation to be output for the at least one specified section of the preferred route is suppressed if the ascertained number or frequency of previous passing of the at least one specified section is at least equal to a specified threshold value,
    wherein the specified threshold is adjustable, and wherein the threshold is adjusted if a deviation from the at least one driving instruction or driving recommendation that guides the at least one user along the preferred route occurs.

2. The navigation system as recited in claim 1, wherein in ascertaining the one of a) the number of times the transportation vehicle has previously passed at least one specified section of the preferred route, or b) the frequency with which the transportation vehicle has previously passed the at least one specified section of the preferred route, only instances of passing which satisfy at least one specified condition are counted.

3. The navigation system as recited in claim 2, wherein the at least one specified condition includes at least one of:
   a) the transportation vehicle is within at least one of a specified time interval and a specified geographical area;
   b) the transportation followed the at least one driving instruction or driving recommendation output for the at least one specified section of the preferred route; and
   c) the transportation vehicle has a qualified passing ratio at least equal to a specified threshold ratio, wherein the qualified passing ratio is a ratio between 1) instances of passing of the at least one specified section of the preferred route that deviates from the at least one driving instruction or driving recommendation for the at least one section of the preferred route, and 2) instances of passing of the at least one specified section of the preferred route that follows the at least one driving instruction or driving recommendation for the at least one specified section of the preferred route.

4. The navigation system as recited in claim 3, further comprising:
   at least one memory unit configured to store information relating to the movement of the transportation vehicle, including information relating to at least one part of a travel route traveled by the transport vehicle.

5. The navigation system as recited in claim 4, wherein the storing of the information relating to the movement of the transportation vehicle is restricted to at least one of a specified time interval and a specified geographical area.

6. The navigation system as recited in claim 5, wherein:
   the counting module ascertains one of a) the number of times the transportation vehicle has previously passed at least one specified section on the preferred route, or b) the frequency with which the transportation vehicle has previously passed the at least one specified section on the preferred route, on the basis of the information stored in the memory unit; and
   wherein the route calculation unit further includes at least one processor module configured to ascertain, on the basis of the one of the number or the frequency ascertained by the counting module, at least one probability of the transportation vehicle passing the at least one specified section of the preferred route.

7. The navigation system as recited in claim 5, further comprising:
   at least one position-finding unit configured to a) record the movement of the transportation vehicle, and b) ascertain the route traveled by the transportation vehicle.

8. The navigation system as recited in claim 4, wherein:
   the counting module ascertains, on the basis of the information stored in the memory unit, one of a) the number of times the transportation vehicle has previously passed at least one specified section on the preferred route, or b) the frequency with which the transportation vehicle has previously passed the at least one specified section on the preferred route, on the basis of the information stored in the memory unit; and
   wherein the route calculation unit further includes at least one processor module configured to ascertain, on the basis of the one of the number or the frequency ascertained by the counting module, at least one probability of the transportation vehicle passing the at least one specified section of the preferred route.

9. The navigation system as recited in claim 1, wherein the threshold is adjusted taking into account at least one temporal component.

10. A method for providing navigation assistance for a transportation vehicle, comprising:
    ascertaining possible routes from a starting point to a destination with the aid of route network data;
    specifying a preferred route among the possible routes;
    ascertain one of a) the number of times the transportation vehicle has previously passed at least one specified section of the preferred route, or b) the frequency with which the transportation vehicle has previously passed the at least one specified section of the preferred route; and
    outputting at least one driving instruction or driving recommendation that guides at least one user along the specified route, wherein the at least one driving instruction or driving recommendation to be output for the at least one specified section of the preferred route is suppressed if the ascertained number or frequency of previous passing of the at least one specified section is at least equal to a specified threshold value,
    wherein the specified threshold is adjustable, and wherein the threshold is adjusted if a deviation from the at least one driving instruction or driving recommendation that guides the at least one user along the preferred route occurs.

11. The method as recited in claim 10, further comprising at least one of:
    storing information relating to the movement of the transportation vehicle, including information relating to at least one part of a travel route traveled by the transport vehicle;
    ascertaining, on the basis of the information stored in the memory unit, one of a) the number of times the transportation vehicle has previously passed at least one specified section on the preferred route, or b) the frequency with which the transportation vehicle has previously passed the at least one specified section on the preferred route; and
    ascertaining, on the basis of the one of the number of times or the frequency ascertained, at least one probability of the transportation vehicle passing the at least one specified section of the preferred route.

12. The method as recited in claim 10, wherein instances of passing of the at least one specified section of the preferred route that deviates from the at least one driving instruction or driving recommendation for the at least one specified section of the preferred route are not counted in ascertaining the one of a) the number of times the transportation vehicle has previously passed at least one specified section of the preferred route, or b) the frequency with which the transportation vehicle has previously passed the at least one specified section of the preferred route, if the instances of passing of the at least one specified section of the preferred route that deviates from the at least one driving instruction or driving recommendation satisfies at least one specified condition.

13. The method as recited in claim 12, wherein the at least one specified condition is defined by a ratio between 1) instances of passing of the at least one specified section of the preferred route that deviates from the at least one driving instruction or driving recommendation for the at least one section of the preferred route, and 2) instances of passing of the at least one specified section of the preferred route that follows the at least one driving instruction or driving recommendation for the at least one specified section of the preferred route.

14. The method as recited in claim 10, wherein in ascertaining the one of a) the number of times the transportation vehicle has previously passed at least one specified section of the preferred route, or b) the frequency with which the transportation vehicle has previously passed the at least one specified section of the preferred route, the one of the number of times or the frequency is reset to zero and the ascertaining process is started over at least one of:

if the at least one specified section of the preferred route is passed by the transportation vehicle in a manner deviating from the at least one driving instruction or driving recommendation; and dependent on at least one specified time interval.

15. The method as recited in claim 10, wherein the specified threshold value for the at least one specified section of the preferred route is determined individually if the transportation vehicle passes the at least one specified section of the preferred route in a manner that deviates from the at least one driving instruction or driving recommendation.

16. The method as recited in claim 10, wherein the specified threshold value for the at least one specified section of the preferred route is increased if the transportation vehicle does not follow the at least one driving instruction or driving recommendation for the at least one specified section of the preferred route.

17. The method as recited in claim 10, wherein the at least one driving instruction or driving recommendation to be output for the at least one specified section of the preferred route is suppressed only for at least one of a specified time interval and a specified geographical area.

18. The method as recited in claim 17, wherein the at least one of the specified time interval and the specified geographical area is one of: a) defined by the user of the navigation assistance in the transportation vehicle; or b) ascertained automatically, by ascertaining the frequency with which the particular destination is selected.

19. A computer-readable non-transitory data storage medium for storing a computer program having a plurality of instruction codes which, when executed on a computer, controls a method for providing navigation assistance for a transportation vehicle, the method comprising:

ascertaining possible routes from a starting point to a destination with the aid of route network data;

specifying a preferred route among the possible routes; ascertain one of a) the number of times the transportation vehicle has previously passed at least one specified section of the preferred route, or b) the frequency with which the transportation vehicle has previously passed the at least one specified section of the preferred route; and outputting at least one driving instruction or driving recommendation that guides at least one user along the specified route, wherein the at least one driving instruction or driving recommendation to be output for the at least one specified section of the preferred route is suppressed if the ascertained number or frequency of previous passing of the at least one specified section is at least equal to a specified threshold value, wherein the specified threshold is adjustable, and wherein the threshold is adjusted if a deviation from the at least one driving instruction or driving recommendation that guides the at least one user along the preferred route occurs.

20. The computer-readable data storage medium as recited in claim 19, wherein the method further comprises at least one of:

storing information relating to the movement of the transportation vehicle, including information relating to at least one part of a travel route traveled by the transport vehicle;

ascertaining, on the basis of the information stored in the memory unit, one of a) the number of times the transportation vehicle has previously passed at least one specified section on the preferred route, or b) the frequency with which the transportation vehicle has previously passed the at least one specified section on the preferred route; and ascertaining, on the basis of the one of the number of times or the frequency ascertained, at least one probability of the transportation vehicle passing the at least one specified section of the preferred route.

21. The computer-readable data storage medium as recited in claim 19, wherein instances of passing of the at least one specified section of the preferred route that deviates from the at least one driving instruction or driving recommendation for the at least one specified section of the preferred route are not counted in ascertaining the one of a) the number of times the transportation vehicle has previously passed at least one specified section of the preferred route, or b) the frequency with which the transportation vehicle has previously passed the at least one specified section of the preferred route, if the instances of passing of the at least one specified section of the preferred route that deviates from the at least one driving instruction or driving recommendation satisfies at least one specified condition.

* * * * *